(12) United States Patent
Lakshminarasimhan

(10) Patent No.: US 7,921,414 B2
(45) Date of Patent: Apr. 5, 2011

(54) METHOD AND SYSTEM FOR COMPILING A SOURCE CODE

(75) Inventor: Muralidharan Kanchi Lakshminarasimhan, Bangalore (IN)

(73) Assignee: Vaakya Technologies, Private Limited, Bangalore (IN)

( * ) Notice: Subject to any disclaimer, the term of this patent is extended or adjusted under 35 U.S.C. 154(b) by 950 days.

(21) Appl. No.: 11/535,502

(22) Filed: Sep. 27, 2006

(65) Prior Publication Data

US 2007/0150876 A1 Jun. 28, 2007

(30) Foreign Application Priority Data

Dec. 27, 2005 (IN) ............................ 1932/CHE/2005

(51) Int. Cl.
*G06F 9/45* (2006.01)
*G06F 17/27* (2006.01)
(52) U.S. Cl. .............................. 717/137; 717/140; 704/9
(58) Field of Classification Search .................. 717/140, 717/143, 137; 704/9
See application file for complete search history.

(56) References Cited

U.S. PATENT DOCUMENTS

| | | | | | |
|---|---|---|---|---|---|
| 5,175,684 | A | * | 12/1992 | Chong | 704/3 |
| 5,892,951 | A | * | 4/1999 | Safonov | 717/144 |
| 6,031,993 | A | * | 2/2000 | Andrews et al. | 717/143 |
| 6,035,121 | A | * | 3/2000 | Chiu et al. | 717/141 |
| 7,293,261 | B1 | * | 11/2007 | Anderson et al. | 717/136 |
| 7,437,704 | B2 | * | 10/2008 | Dahne-Steuber et al. | 717/100 |
| 2004/0194072 | A1 | * | 9/2004 | Venter | 717/140 |
| 2005/0005266 | A1 | * | 1/2005 | Datig | 717/136 |
| 2006/0047500 | A1 | * | 3/2006 | Humphreys et al. | 704/9 |
| 2006/0271920 | A1 | * | 11/2006 | Abouelsaadat | 717/137 |

OTHER PUBLICATIONS

Yu et al., "Making XML document markup international", Oct. 18, 2004, Software—Practice and Experience, Published online Oct. 18, 2004 in Wiley InterScience (www.interscience.wiley.com). DOI: 10.1002/spe.621, pp. 1-14.*
Habash, "Oxygen: A Language Independent Linearization Engine", AMTA 2000, LNAI 1934, Lecture Notes in Computer Science, Springer Berlin / Heidelberg, vol. 1934/2000, pp. 68-79.*
Ding et al., "Design and Implementation of JAVA Just-in-Time Compiler", Nov. 2000, J. Computer Science & Technology, vol. 15, No. 6, pp. 584-590.*
Piskorski et al., "A Flexible XML-based Regular Compiler for Creation and Conversion of Linguistic Resources", 2002, Proceedings of the 3rd International Conference on Language Resources an Evaluation (LREC'02), Las Palmas, Canary Islands, Spain, 2002; pp. 1-6.*

* cited by examiner

*Primary Examiner* — Wei Y Zhen
*Assistant Examiner* — Chih-Ching Chow

(57) ABSTRACT

A method and system for compiling a source code, the source code is written in a source-code-human-language. The method comprises associating a plurality of identifiers to a grammar analyzer. The grammar analyzer comprises an analyzer that corresponds to each identifier. The plurality of identifiers is arranged in a predefined-sequence. Further, the plurality of analyzers in the grammar analyzer is arranged in the predefined-sequence. Also, the method comprises tokenizing the source code in response to associating the plurality of identifiers.

10 Claims, 3 Drawing Sheets

| Lookup Map 205 | | | |
|---|---|---|---|
| INDEXER | ENGLISH | GERMAN | FINNISH |
| 1 | traverse | "durchquerung", | "lapi" |
| 2 | loop | "scleife", | "silmukka" |
| 3 | while | "wahrend", | "aikana" |
| 4 | if | "wenn", | "jos" |
| 5 | else | "solst", | "muuta" |
| 6 | break | "abbrechen", | "keskeyta" |
| 7 | skip | "zeilensprung", | "ohita" |
| 8 | return | "zurukkehren", | "palaa" |
| 9 | OR | "ODER", | "TAI" |
| 10 | AND | "UND", | "JA" |
| 11 | NOT | "NICHT", | "EI" |
| 12 | SET | "SATZ", | "ASETA" |
| 13 | LIST | "LISTE", | "LISTA" |
| 14 | BEF | "VORHER", | "ENNEN" |
| 15 | INS | "EINSATZ", | • |
| 16 | AFT | "NACHHER", | "JÄLKEEN" |
| 17 | DATE_DMY | "DATUM_TMJ", | "PÄIVÄMÄÄRÄ_PVKKVVVV" |
| 18 | DATE_YMD | "DATUM_JMT", | "PÄIVÄMÄÄRÄ_VVVVKKPV" |
| 19 | TIME | "ZEIT", | "AIKA" |
| 20 | NUMBER | "ZAHL", | "LUKU" |
| 21 | INTEGER | "GANZZAHL", | "KOKONAISLUKU" |
| 22 | FRACTION | "BRUCH", | "MURTOLUKU" |

Lookup Map 205

| INDEXER | ENGLISH | GERMAN | FINNISH |
|---|---|---|---|
| 1 | traverse | "durchquerung", | "läpi" |
| 2 | loop | "scleife", | "silmukka" |
| 3 | while | "wahrend", | "aikana" |
| 4 | if | "wenn", | "jos" |
| 5 | else | "solst", | "muuta" |
| 6 | break | "abbrechen", | "keskeytä" |
| 7 | skip | "zeilensprung", | "ohita" |
| 8 | return | "zurukkehren", | "palaa" |
| 9 | OR | "ODER", | "TAI" |
| 10 | AND | "UND", | "JA" |
| 11 | NOT | "NICHT", | "EI" |
| 12 | SET | "SATZ", | "ASETA" |
| 13 | LIST | "LISTE", | "LISTA" |
| 14 | BEF | "VORHER", | "ENNEN" |
| 15 | INS | "EINSATZ", | " |
| 16 | AFT | "NACHHER", | "JÄLKEEN" |
| 17 | DATE_DMY | "DATUM_TMJ", | "PÄIVÄMÄÄRÄ_PVKKVVVV" |
| 18 | DATE_YMD | "DATUM_JMT", | "PÄIVÄMÄÄRÄ_VVVVKKPV" |
| 19 | TIME | "ZEIT", | "AIKA" |
| 20 | NUMBER | "ZAHL", | "LUKU" |
| 21 | INTEGER | "GANZZAHL", | "KOKONAISLUKU" |
| 22 | FRACTION | "BRUCH", | "MURTOLUKU" |

METHOD AND SYSTEM FOR COMPILING A SOURCE CODE

FIELD OF THE INVENTION

The invention relates generally to software programming. More particularly, the invention relates to compiling a source code.

BACKGROUND OF THE INVENTION

In the existing system and method for compiling a source code, the source code is read and tokenized based on the grammar of the source code. The tokenized source code is then analyzed for syntax and semantic. After the analysis of the tokenized source code, an object code is generated. Using the object code, a machine code is generated and executed for completing the process of compilation.

Conventionally for multi-language compilation, a source code written in a base language is translated to a target language before the source code is tokenized. The target language is the language in which a lexer is written. Once the source code is translated from the base language to the target language, the lexer reads through each character of the source code and tokenizes the source code. The process of tokenizing the source code comprises evaluating the characters in the source code. The tokenized source code is then analyzed for syntax and semantic in the target language by a parser. Once the parser analyzes the tokenized source code, a compiler generates an object code, which is further used to generate a machine code. Finally, the machine code is executed to complete the process of compilation.

Another conventional approach for multi-language compilation requires the lexer to be translated to the base language in which the source code is written. This approach further requires the lexer to be recompiled so as to initiate the process of compilation of the source code.

However, the abovementioned methods are time consuming and expensive as they require translation of either the source code to the target language or the lexer to the base language. In addition, the lexer needs to be recompiled after being translated to the base language. As a result, a separate lexer is required for each of the different base languages that are used to write the source code. Also, this requires additional efforts to store and manage different lexers for different base languages. Further, a syntax and semantic check for the translated languages is also required.

There is therefore, a need for a method and system for compiling a source code written in a human language.

SUMMARY

An aspect of the invention is to provide a system and method for compiling a source code written in a human language.

In order to fulfill the above aspects, the method comprises associating a plurality of identifiers to a grammar analyzer. The grammar analyzer comprises an analyzer that corresponds to each identifier and the plurality of identifiers is arranged in a predefined-sequence. The method further comprises tokenizing the source code in response to associating the plurality of identifiers.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the invention:

FIG. 3 is a lookup map, in accordance with an embodiment of the invention.

DETAILED DESCRIPTION OF THE INVENTION

Various embodiments of the invention provide methods and systems for compiling a source code written in a human language. The source code is compiled using a compiler. The compilation of the human language includes the process of defining a syntax and semantics of a programming language in a human language. The programming language includes a plurality of identifiers. The plurality of identifiers comprises a set of keywords, data types and function calls that are parameterized and are uniquely identified in a specific order. The identification of the keywords, data types and function calls can be with a number, a string, an image or the likes. The keywords, data types and function calls are stored in a pre-defined-sequence in a lookup map. The lookup map is used to create a parser table that is used to tokenize the identifiers.

Figure 1:
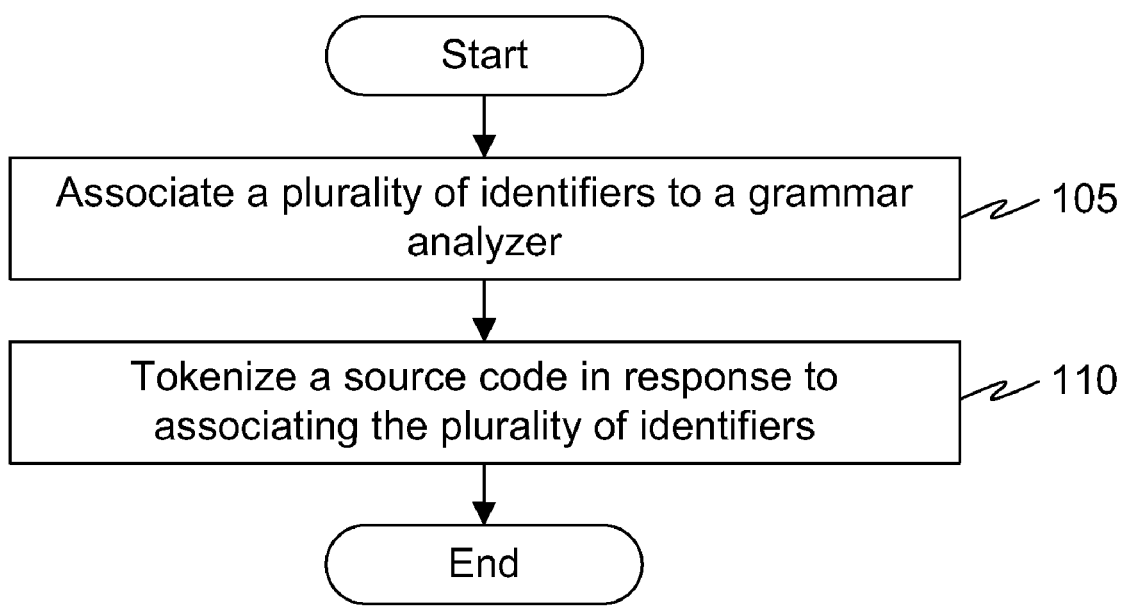
FIG. 1 is a flow diagram of a method for compiling a source code, in accordance with an embodiment of the invention.

FIG. 1 is a flow diagram of a method for compiling a source code, in accordance with an embodiment of the invention. The source code is written in a source-code-human-language. In an exemplary embodiment of the invention, the source-code-human-language is a non-programming human language. Further, the non-programming human language can be, for example, Chinese, German, or French. It will be apparent to a person skilled in the art that the aforementioned examples of the non-programming human language are not exhaustive and can include other languages as well. The source code consists of a plurality of identifiers. The plurality of identifiers are used to name variables, functions, data types and macros. The identifiers can be in the form of a number, a string, an image or the likes. Also, the identifiers can be a combination of letters, digits, and the likes. The plurality of identifiers comprises a set of keywords, data types and function calls. The set of keywords are a reserved set of words used in the source code. And, the set of function calls are commonly used in the source code to link and use another function or a subroutine.

While compiling the source code, the plurality of identifiers included in the source code is compiled using a grammar analyzer. The grammar analyzer comprises a plurality of analyzers. Each identifier has a corresponding analyzer in the grammar analyzer and each analyzer compiles the corresponding identifier. In an embodiment of the invention, the grammar analyzer is written in a language that is different from the source-code-human-language. In another embodiment of the invention, the grammar analyzer is written in a programming language. At step 105, the plurality of identifiers is associated to the grammar analyzer.

The identifiers are arranged in a predefined-sequence. In an exemplary embodiment of the invention, the pre-defined sequence can be, for example, an order in which the identifiers are executed while compiling the source code. Further, the plurality of analyzers in the grammar analyzer is arranged in the predefined-sequence. The plurality of identifiers of the programming language and the plurality of analyzers in the grammar analyzer are read in the predefined-sequence and each analyzer is then associated with the corresponding identifier of the programming language.

At step 110, the source code is tokenized by the grammar analyzer in response to associating the plurality of identifiers. The grammar analyzer reads through the source code and collects sequence of identifiers into a set of tokens. A token is a series of contiguous characters that the grammar analyzer treats as a single unit. The tokens can be in the form of identifiers, numeric constants, character constants, string literals, operators, other separators and punctuators. Further, the grammar analyzer comprises a parser. The parser performs a syntax analysis that determines the structure of the source code. Also, the parser analyzes the tokens obtained from the source code in order to analyze the identifiers in the source code including the keywords, data types and the function calls.

In an exemplary embodiment of the invention, for example, a portion of a source code is written in English language in the following script:

```
integer x, y, z
double a
    if(x > y)
    {
        z = x
    }
    else
    {
        z = y
    }
    for (z = 0; ; z++)
    {
        a = a/ z
    }
    printf("\n program completed")
```

In aforementioned example, the identifiers comprising the keywords, data types and the function calls in the source code are "integer", "double", "if", "else", "for" and "print". "Integer" and "double" are used in the declaration of the data types in the source code. "If", "for", and "else" are statements that are used in the source code. Further, "Printf" is a function call that is used in the source code.

The identifiers are arranged in a predefined sequence in the following manner:

```
<data types>
    integer
    double
</data types>
<Statements>
    if
    else
    for
</Statements>
<Function calls>
    printf
</Function calls>
```

Those of skilled in the art will appreciate this is not an exhaustive list of identifiers in the programming language and will include each identifier particular to a programming language arranged in the predefined-sequence.

Further, the grammar analyzer comprises the plurality of analyzers arranged in the predefined-sequence in the following manner:

```
< data types>
    NULL, int
    NULL, double
</ data types>
< Statements>
    NULL, ifCompiler( )
    NULL, elseCompiler( )
    NULL, forCompiler( )
</ Statements>
< Function calls>
    NULL, printfCompiler( )
</ Function calls>
```

Those of skilled in the art will appreciate this is not an exhaustive list of analyzers in the programming language and will include each analyzer corresponding to each identifiers particular to the programming language arranged in the predefined-sequence.

For initiating the compilation process, the identifiers are associated with the corresponding analyzer in the grammar analyzer as shown below:

```
< data types>
    integer, int
    double, double
</ data types>
< Statements>
    if, ifCompiler( )
    else, elseCompiler( )
    for, forCompiler( )
</ Statements>
< Function calls>
    printf, printfCompiler( )
</ Function calls>
```

Further, the grammar analyzer reads through the source code and collects sequence of identifiers into a set of tokens. The parser performs a syntax analysis on the tokenized source code and analyzes the tokens in order to analyze the identifiers in the source code.

The identifiers including the keywords, data types and the function calls are arranged in the predefined-sequence and are associated to the corresponding analyzer in the grammar analyzer based on the predefined-sequence. Therefore, even if identifiers are referred differently or are written using different source-code-human-language, the grammar analyzer can be used to compile the source code without making changes to it or recompiling it. For example, the keywords "if", "else" and "for" can be referred as "case", "elsecase" and "do" respectively in the source code, and still the grammar analyzer can be used to compile the source code. Similarly, for example, the keywords "if", "else" and "for" can be written in German as "wenn", "sonst" and "fur" respectively and the grammar analyzer can be used to compile the source code without translating either the source code or the grammar analyzer.

Figure 2:
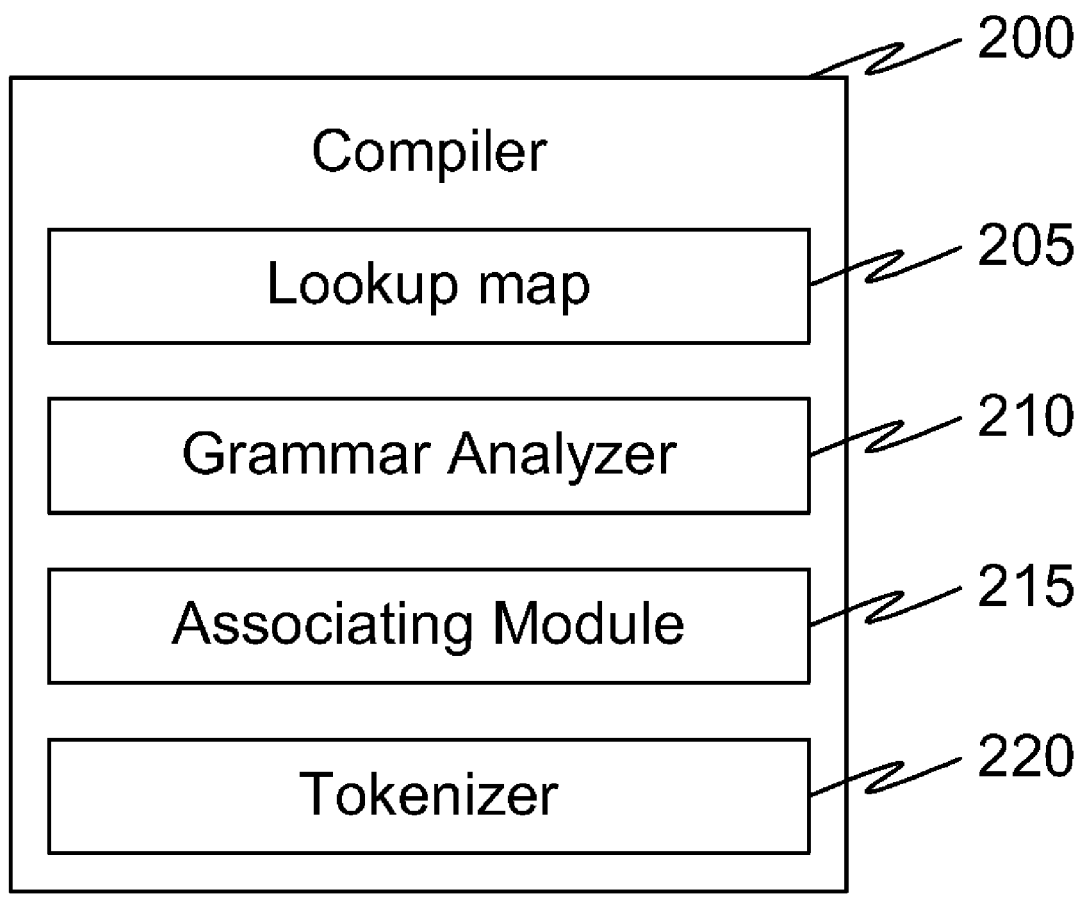
FIG. 2 is a block diagram of a compiler, in accordance with an embodiment of the invention.

FIG. 2 is a block diagram of a compiler 200, in accordance with an embodiment of the invention. The compiler 200 comprises a lookup map 205, a grammar analyzer 210, an associating module 215 and a tokenizer 220.

Lookup map 205, FIG. 3, comprises a plurality of identifiers arranged in a predefined-order. In an embodiment of the invention, the predefined-sequence can be an order in which the identifiers are executed while compiling the source code. In an embodiment of the invention, lookup map 205 can be, for example, a text file, a database table or a binary file storing the identifiers. The plurality of identifiers can include at least one of a set of keywords, data types and function calls. The plurality of identifiers are used to name variables, functions, data types and macros. The identifiers can be identified with a number, a string, an image or the likes. Also, the identifiers can be a combination of letters, digits, and the likes.

The source code, or an associated file, may define or indicate what language the source code is written so that the compiler may identify the identifiers for use with the lookup map 205. The language and/or the lookup map 205 may be user defined and/or modified. The compiler may, for example, perform a character by character tokenization to identify the identifiers based on the language indicated in the source code or associated file. Thus, the compiler identifies the identifiers in the source code. The lookup map 205 may then be used to determine the predefined-sequence or predefined-order of the identifiers, which are indexed in the lookup map 205.

Grammar analyzer 210 comprises a plurality of analyzers. Each identifier has a corresponding analyzer in grammar analyzer 210. The plurality of analyzers in grammar analyzer 210 is arranged in the predefined-sequence. In an embodiment of the invention, grammar analyzer 210 is written in a human language that is different from the source-code-human-language. In another embodiment of the invention, grammar analyzer 210 is written in a programming language. In an embodiment of the invention, at least one of an insert and a delete operation can be performed on grammar analyzer 210 so as to update grammar analyzer 210. Further, grammar analyzer 210 can be updated in runtime.

Associating module 215 associates each identifier to the corresponding analyzer in grammar analyzer 210. Associating module 215 associates an identifier to a corresponding analyzer based on the predefined-sequence. In an embodiment of the invention, grammar analyzer 210 is written in a human language that is different from the source-code-human-language. In an exemplary embodiment of the invention, the source-code-human-language is a non-programming human language. Further, the non-programming human language can be, for example, Chinese, German or French.

In response to associating module 215 associating each identifier to the corresponding analyzer in grammar analyzer 210, tokenizer 220 tokenizes the source code.

FIG. 3 shows a lookup map 205, referred to above, comprising a plurality of identifiers arranged in a predefined-sequence or order as represented by indexers 1-22. In this example implementation, lookup map 205 can store the identifiers in a predefined sequence, such as 1, 2, 3, and so forth. The identifier for each language has the same position in the predefined sequence regardless of the language in which the identifier is expressed as shown in the columns. For example, in FIG. 3, the second column of the lookup map 205 refers to English terms, the third column refers to German terms, and the fourth column refers to Finnish terms. Thus, for example, the term "or", "oder", or "tai" would be associated with the same analyzer, based not on the identifier itself, but on the fact that each of these terms is the ninth word (i.e. associated with indexer in the lookup map 205) in the predefined sequence or order. As the identifiers are associated with the relevant analyzer based on sequential order and not the identifier itself, the need for translating the identifiers in the source code into a target language is eliminated and also the need for writing compilers for different human languages is simplified.

The predefined sequence may be determined based an order in which the identifiers are executed while compiling the source code. The following source code is one example of source code having identifiers that would be executed in an order that could be used to produce and/or could be used with the lookup map 205, shown in FIG. 3:

```
#Define.Procedur der prostockview( )
{
  Stock              varStock
  Item               varItem
  typStock           varTypStock
  gint               varStatus
  typStock SATZ @setTypStock
  setTypStock = NEU( SATZ, typStock)
  durchquerung(Stock, varStock)
  {
    varTypStock.ItemCode = varStock.ItemCode
    varTypStock.StockQty = varStock.StockQty
    varStatus = holen( Item, varItem, (varItem.ItemCode ==
    varStock.ItemCode))
    wenn(varStatus)
    {
      varTypStock.ItemName = varItem.ItemName
      satzfugen( setTypStock, varTypStock)
    }
    entleeren( varTypStock )
  }
  sicht("Stock View",
      setTypStock,
      REIHE_ID       der SNo              (02),
      ItemCode       der Item Code        (05),
      ItemName       der Item Description    (40),
      StockQty       der Quantity         (10.2) GESAMTMENGE
  )
}"
```

The various embodiments of the invention provide a method and a system for compiling a source code written in a human language by associating a plurality of identifiers to a grammar analyzer and tokenizing the source code in response to associating the plurality of identifiers. The identifiers are arranged in a predefined sequence in a look up map and are associated to the grammar analyzer based on the predefined sequence. Therefore, the need for translating the identifiers in the source code into a target language is eliminated and also the need for writing compilers for different human languages is simplified. The identifiers and the grammar analyzer can be modified and/or updated in the lookup map dynamically in runtime. Further, the method eliminates the need for a grammar analyzer to be translated to a source-code-human-language. Also, the method and system for compiling the source code written in human language can be used for compiling assembly level language.

The compiler for compiling a source code, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention.

The computing device executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the computing device to perform specific tasks such as the steps that constitute the method of the invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the computing device may be in response to user commands, or in response to results of previous processing or in response to a request made by another computing device.

What is claimed is:

1. A method performed by a computing device for compiling a source code, the method comprising:
    identifying a plurality of identifiers in the source code, the source code being written in a source-code-human-language, wherein the source-code-human-language is a non-programming human language, selected from a plurality of non-programming human languages, and wherein the plurality of identifiers are indexed in a predefined-sequence in a lookup map and include at least one keyword in the source code, at least one data type for declaring a type of data in the source code, and at least one function call for linking to and using a function or subroutine in the source code;
    associating the plurality of identifiers to a grammar analyzer based on the indexed predefined-sequence and independent of the non-programming human language selected, the grammar analyzer comprising a plurality of analyzers, wherein each identifier is associated with a corresponding analyzer, and wherein the grammar analyzer is written in at least one of a programming language or a human language different from the source-code-human-language; and
    tokenizing the source code in response to associating the plurality of identifiers.

2. The method of claim 1, wherein the plurality of analyzers in the grammar analyzer are arranged in the predefined-sequence.

3. The method of claim 1, wherein the non-programming human language is Chinese.

4. The method of claim 1, wherein tokenizing the source code comprises:
    collecting a sequence of identifiers into a set of tokens by reading the source code using the grammar analyzer; and
    performing a syntax analysis on the set of tokens and analyzing the set of tokens to analyze the sequence of identifiers in the source code using a parser in the grammar analyzer.

5. The method of claim 1, wherein the predefined-sequence is an order in which the plurality of identifiers are executed while compiling the source code.

6. A compiler for compiling a source code, residing in memory of a computing device, the compiler comprising:
    a lookup map, the lookup map comprising a plurality of identifiers in the source code indexed in a predefined-order, the source code being written in a source-code-human-language, wherein the source-code-human-language is a non-programming human language, selected from a plurality of non-programming human languages, and wherein the plurality of identifiers include at least one keyword in the source code, at least one data type for declaring a type of data in the source code, and at least one function call for linking to and using a function or subroutine in the source code;
    a grammar analyzer, the grammar analyzer comprising a plurality of analyzers, wherein the grammar analyzer is written in at least one of a human language different from the source-code-human-language and a programming language;
    an associating module, the associating module associating each identifier to a corresponding analyzer of the plurality of analyzers in the grammar analyzer based on the indexed predefined-order and independent of the non-programming human language selected; and
    a tokenizer, the tokenizer tokenizing the source code in response to the associating module associating each identifier to the corresponding analyzer in the grammar analyzer.

7. The compiler of claim 6, wherein at least one of insert and delete operation can be performed on the grammar analyzer.

8. The compiler of claim 7, wherein the at least one of insert and delete operation can be performed to the lookup map in response to the at least one of insert and delete operation performed on the grammar analyzer.

9. The compiler of claim 6, wherein in the grammar analyzer reads the source code and collects a sequence of identifiers into a set of tokens, and wherein the grammar analyzer includes a parser to perform a syntax analysis on the set of tokens and analyze the set of tokens to analyze the sequence of identifiers in the source code.

10. A computer program product for use with a computer, the computer program product comprising a non-transitory computer usable medium having a computer readable program code embodied therein for compiling a source code, the computer code performing:
    identifying a plurality of identifiers in the source code, the source code being written in a source-code-human-language, wherein the source-code-human-language is a non-programming human language selected from a plurality of non-programming human languages, and wherein the plurality of identifiers are indexed in a predefined-sequence in a lookup map and include at least one keyword in the source code, at least one data type for declaring a type of data in the source code, and at least one function call for linking to and using a function or subroutine in the source code;
    associating the plurality of identifiers to a grammar analyzer based on the indexed predefined-sequence and independent of the non-programming human language selected, the grammar analyzer comprising a plurality of analyzers, wherein each identifier is associated with a corresponding analyzer, and wherein the grammar analyzer is written in at least one of a programming language or a human language different from the source-code-human-language; and
    tokenizing the source code in response to associating the plurality of identifiers.

* * * * *